United States Patent [19]
Scott

[11] Patent Number: 5,950,662
[45] Date of Patent: Sep. 14, 1999

[54] SUPPLEMENTAL WATER SYSTEM

[75] Inventor: Jim C. Scott, Dallas, Tex.

[73] Assignee: Eleven Hundred Springs, Inc., Dallas, Tex.

[21] Appl. No.: 08/705,826

[22] Filed: Aug. 30, 1996

[51] Int. Cl.⁶ .................................................... F16L 5/00
[52] U.S. Cl. .................... 137/357; 137/209; 137/572; 137/589; 137/899
[58] Field of Search .................. 137/899, 209, 137/557, 589, 572, 357

[56] References Cited

U.S. PATENT DOCUMENTS

| | | |
|---|---|---|
| 256,291 | 4/1882 | Coggin . |
| 308,625 | 12/1884 | Norton . |
| 338,984 | 3/1886 | Lawless . |
| 673,842 | 5/1901 | Murphy . |
| 1,044,465 | 11/1912 | Mills . |
| 1,359,673 | 11/1920 | Gronenberger . |
| 1,530,104 | 3/1925 | Brown . |
| 3,028,966 | 4/1962 | Wiesman . |
| 4,962,789 | 10/1990 | Benscoter ................................ 137/571 |
| 5,027,851 | 7/1991 | Drees et al. ............................ 137/359 |
| 5,173,178 | 12/1992 | Kawashima et al. ............... 251/129.04 |
| 5,205,313 | 4/1993 | Moretti .................................... 137/112 |
| 5,240,043 | 8/1993 | Campbell ................................ 137/899 |
| 5,358,009 | 10/1994 | Cambell ................................. 137/899 |
| 5,417,348 | 5/1995 | Perrin .................................... 137/801 |

*Primary Examiner*—A. Michael Chambers
*Attorney, Agent, or Firm*—Daniel V. Thompson

[57] ABSTRACT

A supplemental water system for a building structure includes a tank for storage of supplemental water and a conduit from the tank to at least one user outlet device within the building structure. The outlet conduit and user outlet device are separate from the conventional tap water system within the building structure.

5 Claims, 2 Drawing Sheets

SUPPLEMENTAL WATER SYSTEM

TECHNICAL FIELD

This application relates to water supply systems, and more particularly to a supplemental water system for a building structure having a conventional tap water system.

BACKGROUND ART

A conventional tap water system for a building structure, such as a residence or business building, includes a tap water line coming into the building structure which is then branched to various user outlet devices within the building structure. The user outlet devices typically include faucets, toilets, and various appliances such as dishwashers, washing machines, and refrigerator ice makers. Due to the poor taste and smell of tap water supplied in many locales, it is increasingly common for users to obtain purified or spring water for certain of the user outlets, such as kitchen faucets for drinking and cooking, as well as refrigerator ice makers and drinking water outlets. For obvious reasons, it is not necessary to provide supplemental water of higher quality for other outlets within the building structure, such as the toilets and appliances.

Thus, for example, many consumers purchase spring water or purified water in bottles for use in their residences and office buildings. Similarly, stand-alone supplemental water dispensers having large, replaceable bottles of water are known. A draw-back of the prior art supplemental water systems is the need for constant user attention to replenishment of the supplemental water, as well as the inconvenience of having to obtain the water from bottles or from a special dispenser. Thus, there presently exists a need for a supplemental water system for a building structure, that has its own tank for storage of supplemental water, and that is replenishable without substantial user involvement. In addition, a need exists for a system where supplemental water has separate, convenient user outlet devices, and/or conduit connections to existing appliance outlet devices such as ice makers.

SUMMARY OF THE INVENTION

The present invention provides a supplemental water system for a building structure, where the building structure has a conventional tap water system. The supplemental water system includes a tank for storage of supplemental water, and a conduit from the tank to at least one user outlet device within the building structure. The key feature of the invention is that the outlet conduit and user outlet device or devices are separate from the conventional tap water system within the building structure.

BRIEF DESCRIPTION OF THE DRAWINGS

A more complete understanding of the invention and its advantages will be apparent from the Detailed Description taken in conjunction with the accompanying Drawings, in which.

DETAILED DESCRIPTION OF THE PREFERRED EMBODIMENT

Figure 1:
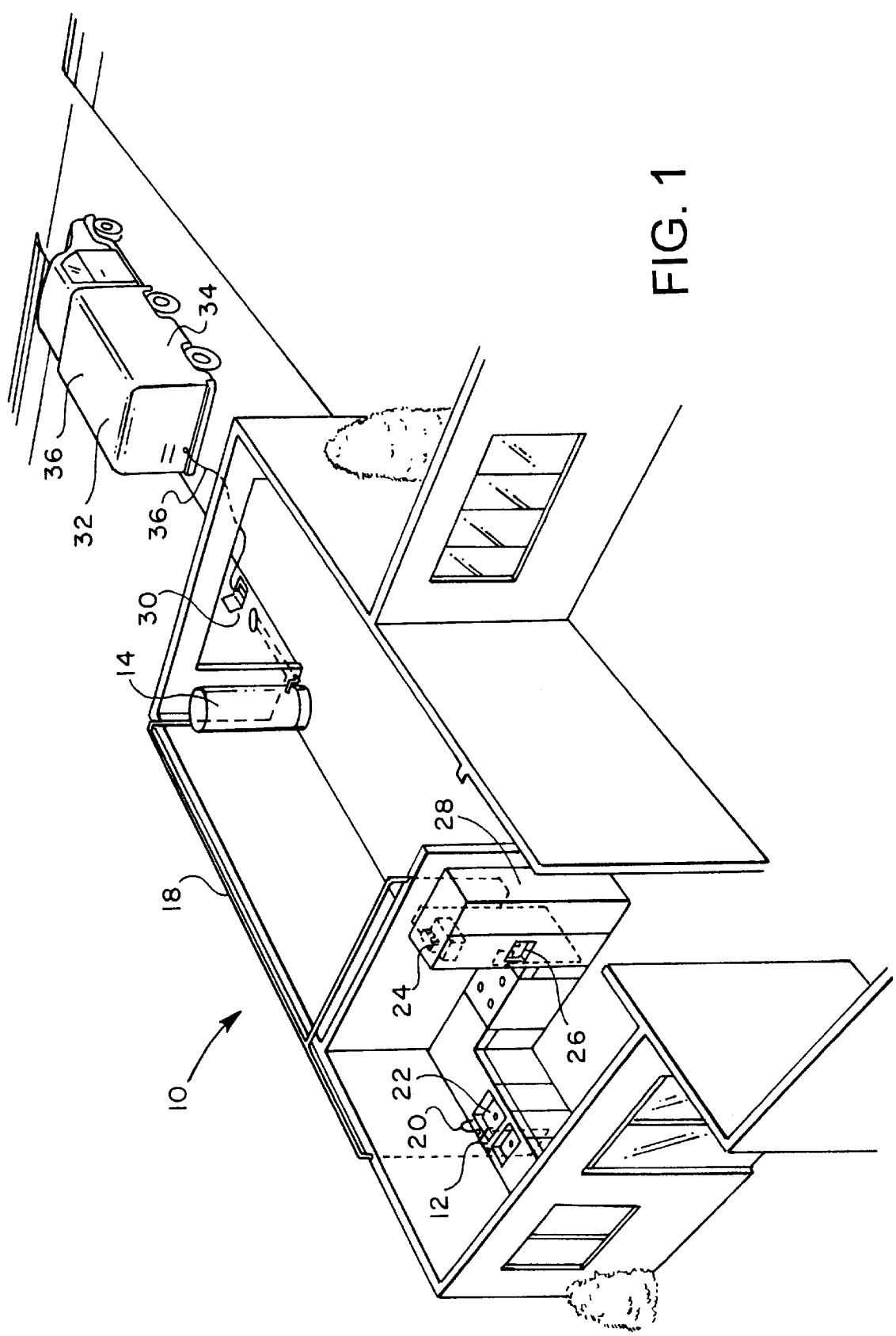
FIG. 1 is a perspective view of a building structure fitted with the supplemental water system of the present invention.
Figure 2:
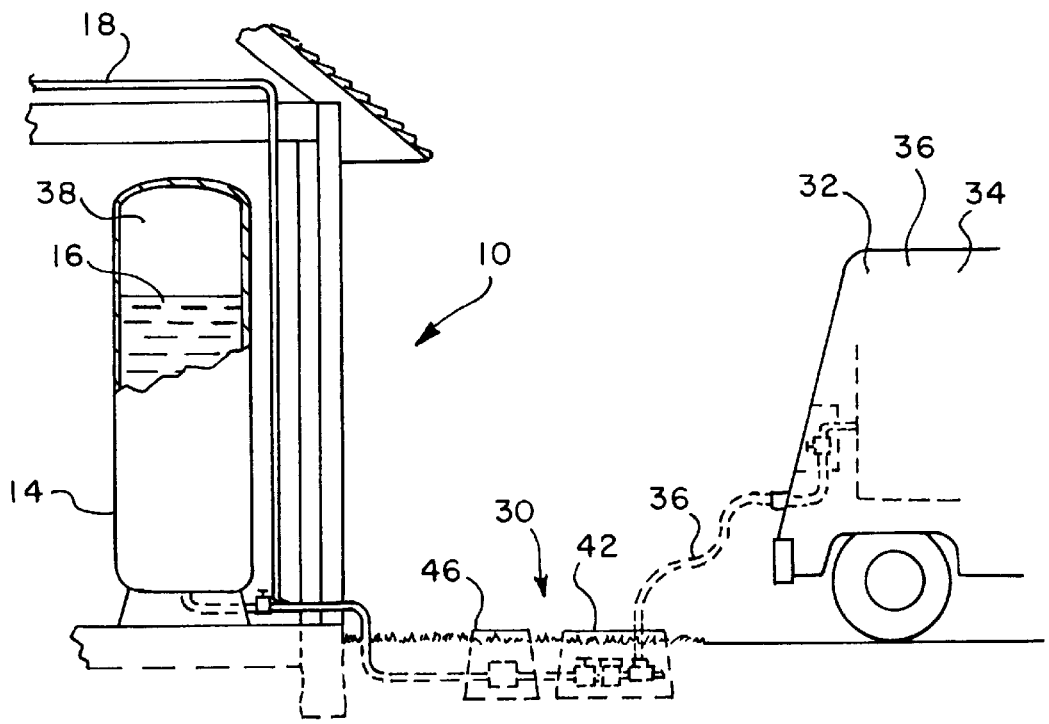
FIG. 2 is a diagrammatic side view of the tank and replenishment port of the system of FIG. 1.
Figure 3:
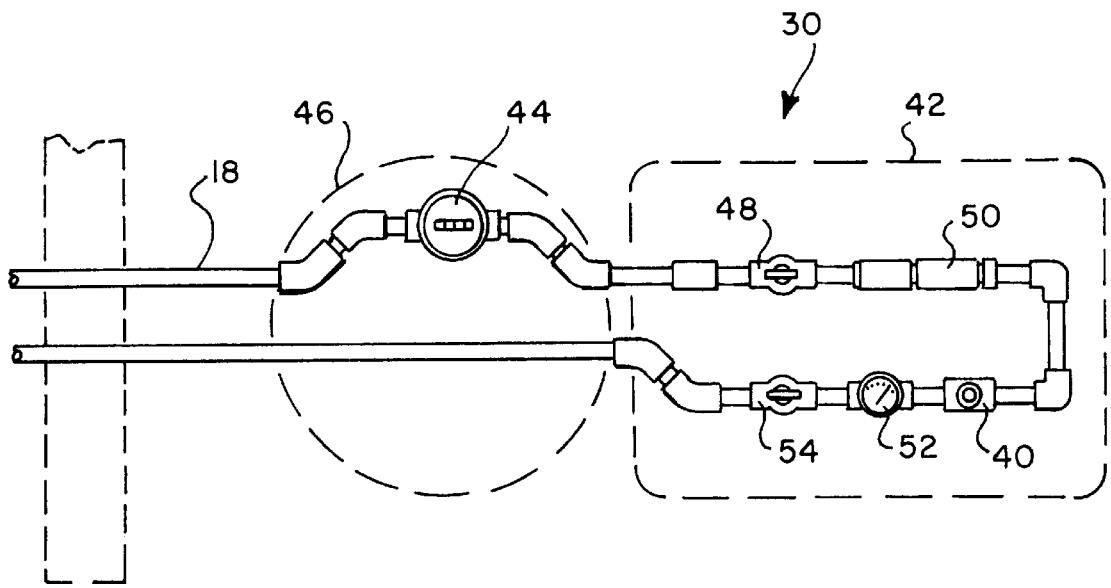
FIG. 3 is a diagrammatic overhead view of the replenishment port.

Referring initially to FIGS. 1–3, where like numerals indicate like and corresponding elements, a building structure 10 has a conventional tap water system, which system is not shown in detail but will be familiar with those skilled in the art. The conventional tap water system includes standard faucet 12 as well as the other typical outlets and appliances throughout building structure 10. Building structure 10 in this illustration is a residence.

The invention is a supplemental water system that includes a tank 14 for storage of supplemental water 16. Supplemental water 16 may be, for example, spring water or purified water having superior taste and smell characteristics and thus being generally more desirable than conventional tap water. In the preferred embodiment, tank 14 is a fiberglass tank having a capacity of about 120 gallons. A conduit 18 is provided from tank 14 to at least one user outlet device 20 within the building structure. In FIG. 1, user outlet device 20 is a separate faucet from conventional tap water faucet 12 at a kitchen sink 22. Typically, however, the supplemental system will be routed to other user outlet devices within the building structure, such as ice maker 24 and drinking water outlet 26 in refrigerator 28. While the three user outlet devices illustrated in FIG. 1 will typically be sufficient for most residences, it will be apparent that the choice of specific user outlet devices is capable of many variations without departing from the scope of this invention.

The supplemental water system includes a port means 30 for periodically replenishing tank 14 with supplemental water 16. The port means is selectively in communication with tank 14, such that periodically the port means may be opened to permit connection to an external source of supplemental water for replenishment. Port means 30 is located in conduit 18 between the tank 14 and the user outlet device 20. Preferably, tank 14 is located within the building structure as shown in FIGS. 1 and 2, while port means 30 is located externally of the building structure.

Delivery means 32 is provided for delivering supplemental water 16 to port means 30, when the port means 30 is selectively in communication with tank 14. In one embodiment, delivery means 32 is a mobile water delivery vehicle 34 adapted to deliver supplemental water to port means 30 under pressure. One convenient water delivery vehicle is a tank truck 36, adapted to selectively connect to port means 30 by way of hose 36, and deliver supplemental water from the tank truck to port means 30 under pressure when the mobile delivery water vehicle is connected to the port means.

In order to transport supplemental water 16 from tank 14 to user outlet device 20, some means must be provided to pressurize supplemental water in tank 14. In one embodiment, the means to pressurize is a gas pocket 38 trapped above water 16 and tank 14 to pressurize the contents of the tank. As supplemental water is delivered to tank 14 by way of port means 30 and delivery means 32, the pressure increases due to the decreasing volume of gas pocket 38. It has been found that filling a 120 gallon tank 14 with 80–90 gallons of water will result in an internal pressure of about 120 psi. This amount of pressure provides suitable conveyance of supplemental water throughout the supplemental water system. Alternate pressurizing means could include a demand pump in communication with the tank or a separate compressed gas container tank in communication with tank 14. A still further alternate means of pressurizing the tank and replenishing the tank with supplemental water is to provide a centrally located supply of pre-charged tanks that the user connects to the system. It will be recognized, however, that the preferred system described and illustrated is designed for minimal user involvement in the replenishment of the system with both water and pressure for the system.

The preferred port means 30 includes a quick disconnect fitting 40 located in a housing 42 that is not normally user-accessible. In contrast, a meter 44 is provided in a user-accessible housing 46, so the user can verify usage of supplemental water and the amount remaining in tank 14 at any given time. Meter 44 is located in conduit 18 between a first shut-off valve 48 and user outlet 20. First shut-off valve is located in conduit 18 between the port means 30 and user outlet 20, to isolate the user outlet 20 during delivery of supplemental water for replenishment. A pressure regulator 50 is located in conduit 18 between the quick disconnect fitting 40 and the first shut-off valve 48 for limiting pressure in the conduit 18 downstream of the regulator to the user outlet 20. A pressure gage 52 is located in conduit 18 between the quick disconnect fitting 40 and tank 14. Finally, a second shut-off valve 54 is located in conduit 18 between the pressure gage 52 and tank 14.

In operation, the supplemental water system of the present invention eliminates the many drawbacks of prior art methods of supplying purified or spring water to building structures such as residences. The system is periodically replenished from the port means located externally of the building structure, which means that the user need not be present or even aware of the periodic replenishment, and payment for the supplemental water used can be billed on a periodic basis as well. Supplemental water is provided directly to special user outlets such as faucets and to particular appliances where taste and smell are important, such as ice maker 24 and drinking water dispenser 26 in refrigerator 28. The key feature of the invention is the provision of a parallel, independent, supplemental water supply, completely separate from the conventional tap water system within the residence or other building structure. The provision of an externally-serviced, replenishable reservoir or tank is what distinguishes the present invention from prior methods of providing supplemental water and what enables the many benefits provided by this invention.

Whereas, the present invention has been described with the respect to a specific embodiment thereof, it will be understood that various changes and modifications will be suggested to one skilled in the art, and it is intended to encompass such changes and modifications as fall within the scope of the appended claims.

I claim:

1. A supplemental water system for a building structure, comprising:

a tank for storage of supplemental water;

a conduit from the tank to at least one user outlet device within the building structure;

port means for periodically replenishing the tank with supplemental water, the port means being selectively in communication with the tank, such that periodically the port means may be opened to permit connection to an external source of supplemental water for replenishment;

the port means being located in the conduit between the tank and the user outlet device;

the tank and user outlet being located within the building structure, and the port means located externally of the building structure;

delivery means for delivering supplemental water to the port means, when the port means is selectively in communication with the tank.

2. The system of claim 1 with the port means including a quick disconnect fitting in the conduit located in an underground housing external to the building structure that is not normally user-accessible.

3. The system of claim 2 with a meter provided in an underground user-accessible housing external to the building structure, such that the user can verify usage of supplemental water and the amount remaining in tank.

4. The system of claim 3 with the meter located in the conduit between a first shut-off valve and the user outlet, the first shut-off valve located in the conduit between the port means quick disconnect fitting and the user outlet, to isolate the user outlet during delivery of supplemental water for replenishment.

5. The apparatus of claim 4 with a pressure regulator located in the conduit between the port means and the first shut-off valve for limiting pressure in the conduit downstream of the regulator to the user outlet;

a pressure gage located in the conduit between the port means and tank; and a second shut-off valve located in the conduit between the pressure gage and the tank.

* * * * *